(12) United States Patent
Foster et al.

(10) Patent No.: US 7,288,039 B2
(45) Date of Patent: Oct. 30, 2007

(54) MULTIPLEXED PRESSURE SWITCH SYSTEM FOR AN ELECTRICALLY VARIABLE HYBRID TRANSMISSION

(75) Inventors: Michael D. Foster, Carmel, IN (US); Charles F. Long, Pittsboro, IN (US)

(73) Assignee: General Motors Corporation, Detroit, MI (US)

( * ) Notice: Subject to any disclaimer, the term of this patent is extended or adjusted under 35 U.S.C. 154(b) by 173 days.

(21) Appl. No.: 11/263,216

(22) Filed: Oct. 31, 2005

(65) Prior Publication Data

US 2007/0099739 A1 May 3, 2007

(51) Int. Cl.
*F16H 3/72* (2006.01)
(52) U.S. Cl. .......................................... 475/5
(58) Field of Classification Search ............ 475/5; 477/3; 180/65.7–65.8
See application file for complete search history.

(56) References Cited

U.S. PATENT DOCUMENTS

| | | | |
|---|---|---|---|
| 4,070,927 A | 1/1978 | Polak | 475/286 |
| 5,601,506 A | 2/1997 | Long et al. | 475/120 |
| 5,911,244 A | 6/1999 | Long et al. | 137/625.64 |
| 6,375,591 B1* | 4/2002 | Wakahara et al. | 475/119 |
| 6,382,248 B1 | 5/2002 | Long et al. | 137/557 |
| 6,551,208 B1 | 4/2003 | Holmes et al. | 475/5 |
| 6,860,830 B2* | 3/2005 | Saitou et al. | 475/127 |
| 7,128,676 B2* | 10/2006 | Kinugasa et al. | 475/5 |
| 2007/0049442 A1* | 3/2007 | Long et al. | 475/5 |
| 2007/0117671 A1* | 5/2007 | Long et al. | 475/116 |

* cited by examiner

Primary Examiner—Dirk Wright (57) ABSTRACT

A powertrain has an electrically variable hybrid transmission having an electro-hydraulic control system, plurality of electrical power units, and a plurality of torque transmitting mechanisms selectively engageable by the electro-hydraulic control system to provide four forward speed ranges, a neutral condition, an electric low speed mode, an electrically variable low and high speed mode, and two electrical power off drive home modes. The electro-hydraulic control system includes a multiplexed pressure switch system. The multiplexed pressure switch system of the present invention allows position detection of five torque transmitting mechanism control valves through the use of only four pressure switches.

17 Claims, 3 Drawing Sheets

MULTIPLEXED PRESSURE SWITCH SYSTEM FOR AN ELECTRICALLY VARIABLE HYBRID TRANSMISSION

TECHNICAL FIELD

The present invention relates to electro-hydraulic control systems for electrically variable hybrid transmissions.

BACKGROUND OF THE INVENTION

Multi-speed power transmissions, particularly those using planetary gear arrangements, require a hydraulic system to provide controlled engagement and disengagement, on a desired schedule, of the clutches and brakes or torque transmitting mechanisms that operate to establish the ratios within the planetary gear arrangement.

These control systems have evolved from substantially pure hydraulic control systems, wherein hydraulic devices produce all of the control signals to electro-hydraulic control systems, wherein an electronic control unit produces a number of the control signals. The electronic control unit emits electrical control signals to solenoid valves, which then issue controlled hydraulic signals to the various operating valves within the transmission control.

With many of the early pure hydraulic and first generation electro-hydraulic control systems, the power transmission utilized a number of freewheel or one-way devices which smooth the shifting or ratio interchange of the transmission during both upshifting and downshifting of the transmission. This relieves the hydraulic control system from providing for the control of overlap between the torque transmitting mechanism that was coming on and the torque transmitting mechanism that was going off. If this overlap is excessive, the driver feels a shudder in the drivetrain, and if the overlap is too little, the driver experiences engine flare or a sense of coasting. The freewheel device prevents this feeling by quickly engaging when the torque imposed thereon is reversed from a freewheeling state to a transmitting state.

The advent of electro-hydraulic devices gave rise to what is known as clutch-to-clutch shift arrangements to reduce the complexity of the transmission and the control. These electro-hydraulic control mechanisms are generally perceived to reduce cost and reduce the space required for the control mechanism.

In addition, with the advent of more sophisticated control mechanisms, the power transmissions have advanced from two-speed or three-speed transmissions to five-speed and six-speed transmissions. In at least one presently available six-speed transmission, just five friction devices are employed to provide six forward speeds, neutral condition, and a reverse speed. Such a gear arrangement is shown in U.S. Pat. No. 4,070,927 issued to Polak on Jan. 31, 1978. The use of the planetary gearset shown in the Polak patent has given rise to a number of electro-hydraulic control mechanisms, such as that shown in U.S. Pat. No. 5,601,506, issued to Long et al. on Feb. 11, 1997. The torque capacity of a torque transmitting mechanism (on-coming or off-going) involved in a shift may be conveniently controlled by the combination of an electrically activated solenoid valve and a pressure regulator valve or trim valve, as disclosed, for example, in the U.S. Pat. No. 5,911,244 to Long et al., issued on Jun. 15, 1999, assigned to the assignee of the present invention, and incorporated herein by reference. In a typical system, the solenoid valve is activated by pulse-width-modulation (PWM) at a controlled duty cycle to develop a pilot pressure for the pressure regulator valve or trim valve, which in turn, supplies fluid pressure to the torque transmitting mechanisms in proportion to the solenoid duty cycle.

Additionally, an electrically variable hybrid transmission has been proposed to improve fuel economy and reduce exhaust emissions. The electrically variable hybrid transmission splits mechanical power between an input shaft and an output shaft into a mechanical power path and an electrical power path by means of differential gearing. The mechanical power path may include clutches and additional gears. The electrical power path may employ two electrical power units, or motor/generator assemblies, each of which may operate as a motor or a generator. With an electrical storage system, such as a battery, the electrically variable hybrid transmission can be incorporated into a propulsion system for a hybrid electric vehicle. The operation of such an electrically variable hybrid transmission is described in the U.S. Pat. No. 6,551,208 to Holmes et al., issued on Apr. 22, 2003 which is hereby incorporated by reference in its entirety.

The hybrid propulsion system uses an electrical power source as well as an engine power source. The electrical power source is connected with the motor/generator units through an electronic control unit, which distributes the electrical power as required. The electronic control unit also has connections with the engine and vehicle to determine the operating characteristics, or operating demand, so that the motor/generator assemblies are operated properly as either a motor or a generator. When operating as a generator, the motor/generator assembly accepts power from either the vehicle or the engine and stores power in the battery, or provides that power to operate another electrical device or another motor/generator assembly.

It is important to reliably and inexpensively diagnose torque transmitting mechanism engagement and disengagement in the above described torque transmitting mechanism controls, both to verify shift progression, and to detect an inadvertent engagement or disengagement. This can be accomplished either indirectly by analyzing the transmission input and output speeds, or directly by installing pressure switches at each of the clutches. However, the diagnostic output with either of these techniques is only developed once the respective clutch has actually started to engage or disengage, which is not especially desirable if the engagement or disengagement is inadvertent. Theoretically, one could alternatively measure the pilot pressure or the position of the trim valve, but such approaches may be expensive to implement and inaccurate due to the characteristic dithering of a trim valve.

An effective way to determine a change in the trim valve position is to provide a pressure sensitive switch in fluid communication with the trim valve and operable to be selectively pressurized or de-pressurized when the trim valve changes position. Traditionally, this method of valve state diagnostics would require a separate pressure switch for each valve, i.e. six pressure switches for six valves. However, packaging space and cost constraints may make this option unfeasible. Accordingly, what is needed is an inexpensive clutch pressure control arrangement that provides a reliable diagnostic output early in the clutch pressure control process while relying on a minimum of pressure switches.

SUMMARY OF THE INVENTION

The present invention provides an improved electro-hydraulic control system having a multiplexed (one source controlling multiple functions) pressure switch system for an electrically variable hybrid transmission. The multiplexed pressure switch system of the present invention allows position detection of five torque transmitting mechanism control valves with only four pressure switches.

A pressure switch diagnostic system for an electrically variable hybrid transmission is provided having a plurality of trim valves each having a first and a second position and a plurality of pressure sensitive switches, having a high and a low pressure state, each in selective fluid communication with one of the plurality of trim valves. Each of the plurality of pressure sensitive switches are operable to detect a change from the first to the second position or a change from the second to the first position of its respective one of the plurality of trim valves and accordingly each of the plurality of pressure switches will report one of the high or the low pressure state. Also provided is at least one logic valve in selective fluid communication with at least one of the plurality of pressure sensitive switches such that at least one of the plurality of pressure sensitive switches are operative to detect position changes in the at least one logic valve without requiring an additional pressure sensitive switch to detect a change in position of the at least one logic valve.

A first of the at least one logic valve having a first position and a second position may be disposed in selective fluid communication with a first and a second of the plurality of trim valves respectively having a first and second of the plurality of pressure sensitive switches in selective fluid communication therewith. The first and the second of the plurality of pressure sensitive switches are operable to detect a change in position of the first of the at least one logic valve when the first of the at least one logic valve moves from the first to the second position or from the second to the first position, irrespective of the position of the first and second of the plurality of trim valves. Additionally, a second of the at least one logic valve, having a first position and a second position, may be disposed in selective fluid communication with a third of the plurality of pressure sensitive switches disposed in selective fluid communication therewith. The third of the plurality of pressure sensitive switches is operable to detect a change in position of the second of the at least one logic valve from the first position to the second position or the second position to the first position. The plurality of trim valves may be solenoid operated pressure regulator valves and the at least one logic valve may be a multiplex valve, each of which may be selectively controlled by an electronic control unit. The plurality of pressure sensitive switches may selectively report the high and the low pressure state to an electronic control unit.

In another aspect of the present invention, a pressure switch diagnostic system for an electrically variable hybrid transmission is provided having a first trim valve, having a first position and a second position, in selective fluid communication with a first pressure sensitive switch. The first pressure sensitive switch is operable to detect and report a change from the first to the second position or the second to the first position of the first trim valve. A second trim valve, having a first position and a second position, in selective fluid communication with a second pressure sensitive switch is also provided. The second pressure sensitive switch is operable to detect and report a change from the first to the second position or the second to the first position of the second trim valve. A first logic valve, having a first position and a second position, disposed in selective fluid communication with each of the first trim valve and the second trim valve is also provided. The first and second trim valves and the first and second pressure sensitive switches and the first logic valve are connected in a multiplexed arrangement such that there are fewer of the pressure sensitive switches than the sum of the trim valves and the logic valve.

The first pressure sensitive switch and the second pressure sensitive switch may be operable to detect a change from the first to the second position or the second to the first position of the first logic valve irrespective of the position of the first trim valve and the second trim valve. Additionally, a third trim valve, having a first position and a second position, in selective fluid communication with a third pressure sensitive switch may be provided. The third pressure sensitive switch may be operable to detect and report a change from the first to the second position or the second to the first position of the third trim valve. A second logic valve, having a first position and a second position, disposed in selective fluid communication with a fourth pressure sensitive switch may be provided. The fourth pressure sensitive switch may operable to detect and report a change from the first to the second position or the second to the first position of the second logic valve.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
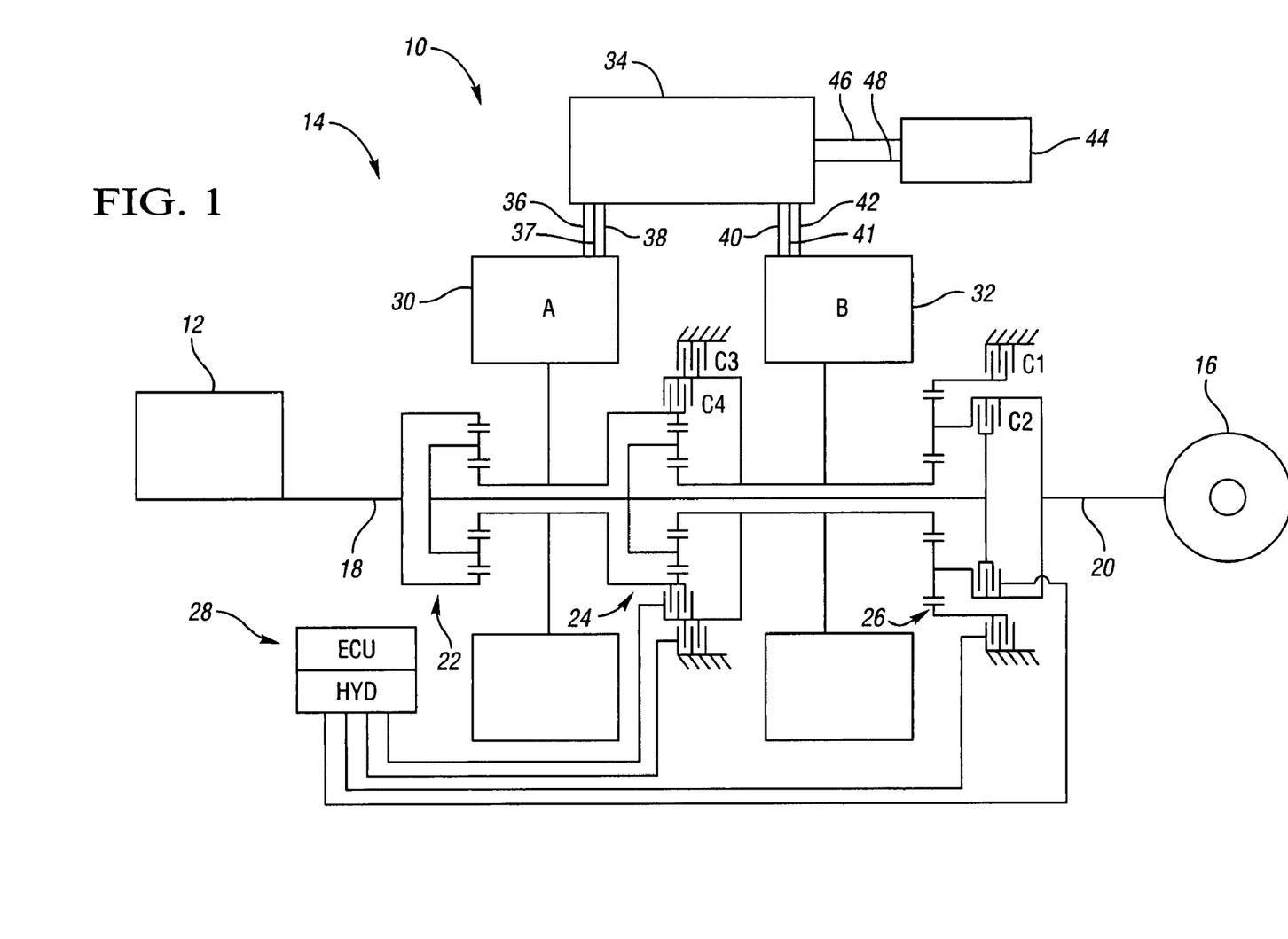
FIG. 1 is a schematic representation of a electrically variable hybrid vehicular powertrain for use with the present invention.

Referring to the drawings wherein like characters represent the same or corresponding parts throughout the several views, there is seen in FIG. 1 a powertrain 10 having an engine 12, an electrically variable hybrid transmission 14, and a final drive 16.

Figure 2A:
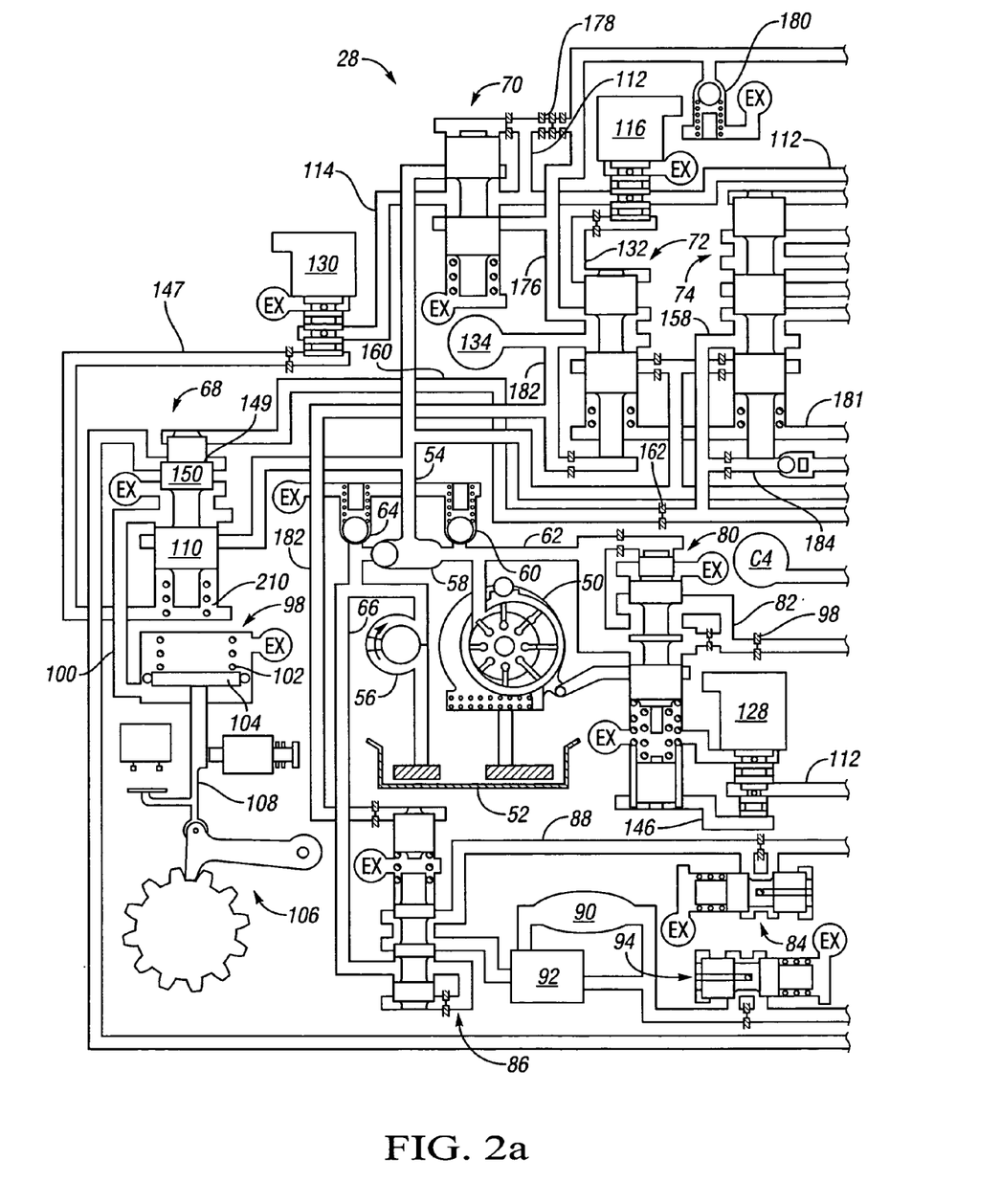
FIGS. 2a and 2b, taken together, represent a schematic representation describing the electro-hydraulic control system utilized with the powertrain of FIG. 1, depicting the control system in an electrical power ON, park/neutral mode of operation.
Figure 2B:
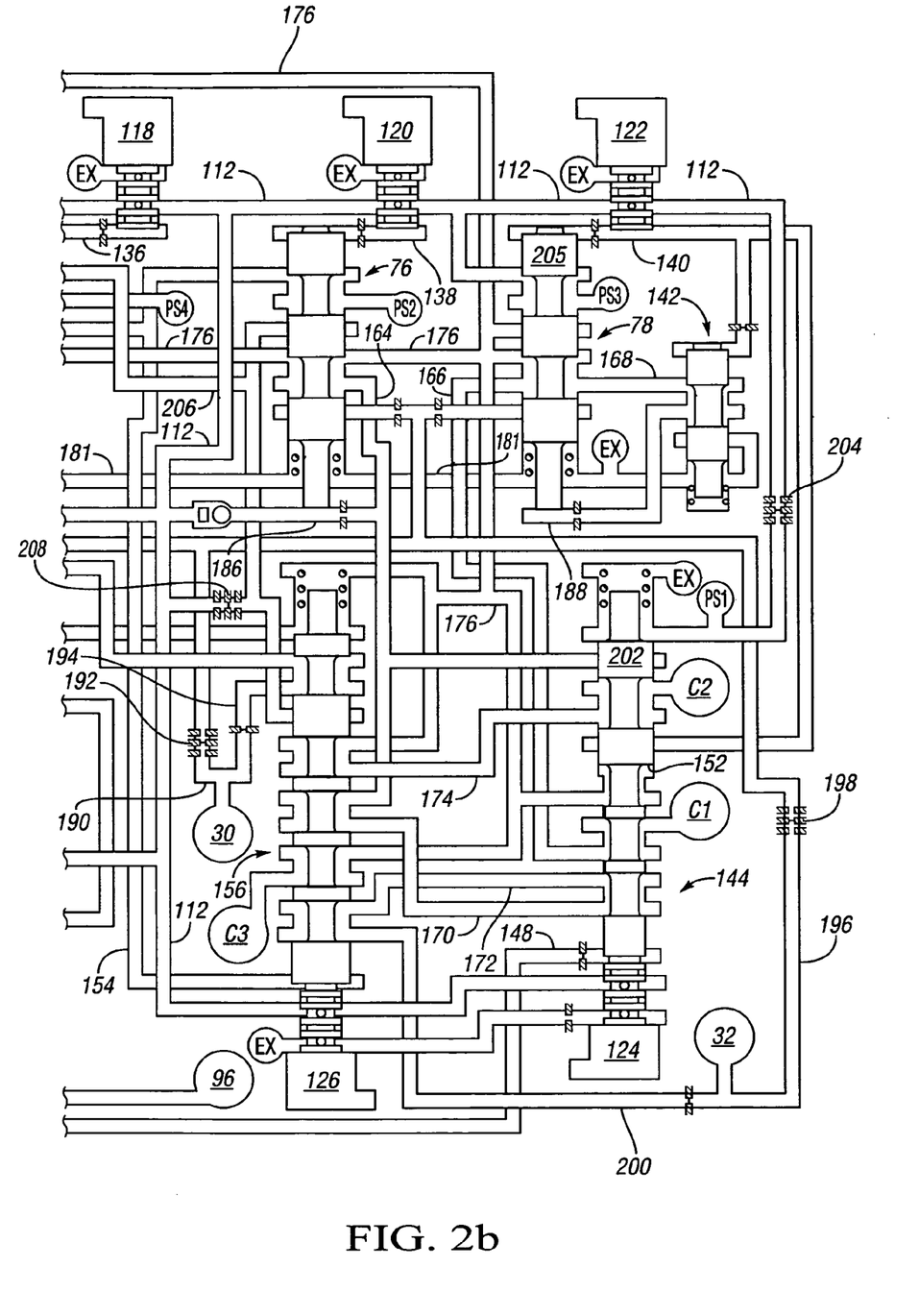

The engine 12 is an internal combustion engine. The electrically variable hybrid transmission 14 includes a planetary gear arrangement having an input shaft 18, an output shaft 20, three planetary gearsets 22, 24, and 26, four torque transmitting mechanisms C1, C2, C3, and C4, and an electro-hydraulic control system 28. The torque transmitting mechanisms C2 and C4 are fluid-operated rotating clutch-type devices, while the torque transmitting mechanisms C1 and C3 are fluid-operated stationary clutch or brake devices. The selective engagement and disengagement of the torque transmitting devices is controlled by an electro-hydraulic control system 28, which is shown in FIGS. 2a and 2b.

Further incorporated into the electrically variable hybrid transmission 14 is a pair of electrical power units or motor/generators 30 or A and 32 or B that are controlled by an electronic control unit 34. The electronic control unit 34 is connected with the electrical power unit 30 through three electrical conductors 36, 37, and 38, and is connected with the electrical power unit 32 through three electrical conductors 40, 41, and 42. The electronic control unit 34 is also in electrical communication with an electrical storage device 44, which is connected with the electronic control unit 34 through a pair of electrical conductors 46 and 48. The electrical storage device 44 is generally one or more electrical batteries.

The electrical power units 30 and 32 are preferably motor/generator units, which can operate as a power supplier or as a power generator. When operating as a motor or power supplier, the electrical power units 30 and 32 will supply power to the electrically variable hybrid transmission 14. When operating as generators, the electrical power units 30 and 32 will take electrical power from the transmission, and the electronic control unit 34 will either distribute the power to the electrical storage device 44 or distribute the power to the other power unit, which will be operating as a motor at that time.

The electronic control unit 34 receives a number of electrical signals from the vehicle and transmission, such as engine speed, throttle angle, vehicle speed, to name a few. These electrical signals are used as input signals for a programmable digital computer, which is incorporated within the electronic control unit 34. The computer is then effective to distribute the electrical power as required to permit the operation of the electrically variable hybrid transmission 14 in a controlled manner.

The planetary gear arrangement, as shown in FIG. 1, provides four forward speed ratios or ranges between the input shaft 18 and the output shaft 20. In the first forward range, the torque transmitting mechanisms C1 and C4 are engaged. In the second forward range, the torque transmitting mechanisms C1 and C2 are engaged. In the third forward range, the torque transmitting mechanisms C2 and C4 are engaged. In the fourth forward range, the torque transmitting mechanisms C2 and C3 are engaged. The gearing also provides a park/neutral condition when the torque transmitting mechanisms C1, C2, C3 and C4 are disengaged. An electrically variable low mode of operation is provided wherein the torque transmitting mechanism C1 is engaged, and an electrically variable high mode of operation is provided wherein the torque transmitting mechanism C2 is engaged.

The powertrain 10 may operate in a purely electric mode. The engine off, electric low speed mode of operation is facilitated by engaging the C1 torque transmitting mechanism. The powertrain 10 has two speed ranges of drive-home capabilities within the electrically variable hybrid transmission 14 in the event that the electro-hydraulic control system 28 undergoes a malfunction or discontinuance of electrical power. In the electrical power off drive home modes, the electro-hydraulic control system 28 defaults to an electrically variable low mode of operation wherein the torque transmitting mechanism C1 is engaged, and an electrically variable high mode of operation wherein the torque transmitting mechanism C2 is engaged. The electrically variable hybrid transmission 14 is capable of operating in a parallel reverse mode of operation. In the parallel reverse mode, the electrically variable hybrid transmission 14 operates in an electrically variable low mode of operation wherein the torque transmitting mechanism C1 is engaged.

The electro-hydraulic control system 28 includes an electronic control unit (ECU) and a hydraulic control unit (HYD). The ECU incorporates a conventional digital computer that is programmable to provide electrical signals to the hydraulic portion of the electro-hydraulic control system 28 to establish the engagement and disengagement of the torque transmitting mechanisms C1, C2, C3, and C4. FIGS. 2a and 2b, taken together, show the electro-hydraulic control system 28 in detail. As shown in FIGS. 2a and 2b, the hydraulic portion of the electro-hydraulic control system 28 includes a hydraulic pump 50, such as a variable displacement pump, that draws fluid from the reservoir 52 for delivery to a main passage 54. Alternately, an electrically controlled hydraulic pump 56 is provided for operation in the electric mode. A check valve 58 operates to selectively distribute pressurized fluid to the main passage 54 depending upon which pump 50 or 56 is operating. A relief valve 60 is provided in fluid communication with an outlet passage 62 of the hydraulic pump 50 to guard against over pressurization of the main passage 54 when the hydraulic pump 50 is operating. Likewise, a relief valve 64 is provided in fluid communication with an outlet passage 66 of the electrically controlled hydraulic pump 56 to guard against over pressurization of the main passage 54 when the electrically controlled hydraulic pump 56 is operating. The pressure relief valves 60 and 64 will exhaust should an over pressurized condition manifest itself within the main passage 54. The main passage 54 is in fluid communication with an electronic transmission range selection (ETRS) valve 68, an actuator feed regulator valve 70, a damper lock-out clutch trim valve 72, a trim valve 74, a trim valve 76, and a trim valve 78.

A line regulator valve 80 communicates with pressurized fluid within the outlet passage 62 when the hydraulic pump 50 is operating. The line regulator valve 80 establishes the pressure within the main passage 54, and a portion of that fluid is delivered to a passage 82, which communicates with a cooler regulator valve 84. The fluid exiting the cooler regulator valve 84 communicates with an auxiliary pump regulator valve 86 via a passage 88. When the auxiliary pump regulator valve 86 is in a spring set position, fluid within the passage 88 is allowed to pass into a cooler 90 and/or a cooler bypass valve 92. The cooler bypass valve 92 is operable to provide fluid flow in the event that fluid passage through the cooler 90 is blocked. The fluid from the cooler 90 and/or cooler bypass valve 92 is then distributed to a lubrication system regulator valve 94. The lubrication system regulator valve 94 operates to distribute pressurized fluid to the lubrication system 96 of the electrically variable hybrid transmission 14. In practice, only one of the cooler regulator valve 84 and the lubrication system regulator valve 94 may be necessary for proper functioning of the electro-hydraulic control system 28.

Alternately, the auxiliary pump regulator valve 86 communicates with pressurized fluid within the outlet passage 66 when the electrically controlled hydraulic pump 56 is operating. The auxiliary pump regulator valve 86 establishes the pressure within the main passage 54, and when that pressure is satisfied, fluid is allowed to pass into the cooler 90 and/or the cooler bypass valve 92. The cooler bypass valve 92 is operable to provide fluid flow in the event that fluid passage through the cooler 90 is blocked. The fluid from the cooler 90 and/or cooler bypass valve 92 is then distributed to a lubrication system regulator valve 94. The lubrication system regulator valve 94 operates to distribute pressurized fluid to the lubrication system 96 of the electrically variable hybrid transmission 14.

The ETRS valve 68 operates to selectively communicate pressurized fluid from the main passage 54 to a servo 98 via a passage 100. When the ETRS valve 68 is in a pressure set position, the pressurized fluid within the main passage 54 is introduced to the servo 98 via the passage 100. When the fluid pressure within the servo 98 is sufficient to overcome the bias of a spring 102, a piston 104, interconnected with a park pawl mechanism 106 via a link 108, moves within the servo 98 thereby disengaging the park pawl mechanism 106. When the ETRS valve 68 is in the spring set position, shown in FIG. 2a, a land 110 blocks the flow of pressurized fluid from the main passage 54, and the passage 100 will exhaust.

The actuator feed regulator valve 70 reduces the pressure within the main passage 54 to a control pressure within a passage 112 and a passage 114. The fluid within the passage 112 communicates with a plurality of solenoid valves 116, 118, 120, 122, 124, 126, and 128. The fluid within the passage 114 communicates with a solenoid valve 130. The solenoid valves 124 and 126 are on/off type solenoid valves, while the solenoid valves 116, 118, 120, 122, 128, and 130 are variable pressure type solenoid valves. The solenoid valves 120, 122, and 128 are normally high or normally open type solenoid valves, while the remaining solenoid valves 116, 118, 124, 126, and 130 are normally low or normally closed type solenoid valves. A normally open solenoid valve will distribute output pressure in the absence of an electrical signal to the solenoid.

The solenoid valve 116 is operable to provide an output pressure in passage 132 that controls the bias pressure or control pressure on the damper lock-out clutch trim valve 72. The damper lock-out clutch trim valve 72 is operable to selectively engage a damper lock-out clutch 134 when transitioning into and out of the electric mode of operation.

The solenoid valve 118 is operable to provide an output pressure in a passage 136 that controls the bias pressure on the trim valve 74. The solenoid valve 120 is operable to provide an output pressure in passage 138 that controls the pressure bias on the trim valve 76. The solenoid valve 122 is operable to provide an output pressure in a passage 140 that controls the pressure bias on the trim valve 78. Additionally, the output pressure within passage 140 controls the pressure bias on a boost valve 142 and is further communicated to a logic valve 144. With the passage 140 pressurized, the boost valve 142 is biased to a pressure set position. Alternately, with the passage 140 exhausted, the boost valve 142 will move to a spring set position, as shown in FIG. 2b. The trim valves 72, 74, 76, and 78 are selectively biased into a second position or a pressure set position by fluid pressure within their respective passages 132, 136, 138, and 140. When the passages 132, 136, 138, and 140 exhaust, their respective trim valves 72, 74, 76, and 78 move to a first position or a spring set position. Additionally, the trim valves 72, 74, 76, and 78 have a trim or pressure regulation position.

The solenoid valve 128 is operable to provide an output pressure in passage 146 that controls pressure bias to the line regulator valve 80. The solenoid valve 128, by modulating the fluid pressure within passage 146, is operable to vary the operating characteristics of the line regulator valve 80 thereby modulating the pressure value within the main passage 54 for torque based pressure control. The solenoid valve 130 is operable to provide an output pressure in passage 147, which operates to de-latch the ETRS valve 68 and place the ETRS valve 68 in a spring set position.

The solenoid valve 124 is operable to provide an output pressure in passage 148 that controls the pressure bias on the logic valve 144. Additionally, the output pressure in passage 148 communicates pressurized fluid to the ETRS valve 68 and is operable to selectively bias the ETRS valve 68 into a pressure set position by engaging a differential area 149 on a land 150. The logic valve 144 has a differential area 152 operable to latch the logic valve 144 in a pressure set position when the electrical power to the solenoid valve 124 is interrupted. Pressurized fluid within the passage 140 provides the differential area 152 with the force necessary to bias the logic valve 144 in a pressure set position. The solenoid valve 126 is operable to provide an output pressure in passage 154 that controls the pressure bias on a logic valve 156. The output pressure in the passage 154 is also communicated to the trim valves 74 and 76. Logic valves 144 and 156 each have a first position or a spring set position, and a second position or a pressure set position.

The logic valves 144 and 156 multiplex the trim valves 74, 76, and 78 to provide control to the four torque transmitting mechanisms C1, C2, C3, and C4. The logic valve 144 selectively communicates pressurized fluid to control the engagement of the torque transmitting mechanisms C1 and C2. While the logic valve 156 selectively communicates pressurized fluid to control the engagement of the torque transmitting mechanisms C3 and C4. The multiplexed trim valve configuration also provides control of fluid flow to effect cooling of the motor/generator 30 and motor/generator 32.

The trim valve 74 selectively communicates pressurized fluid through an outlet passage 158 to the logic valve 156. The outlet passage 158 communicates pressurized fluid to a passage 160 through a flow control orifice 162. The passage 160 is operable to provide pressurized fluid to bias the ETRS valve 68 into a pressure set position. The trim valve 76 selectively communicates pressurized fluid through an outlet passage 164 to both logic valves 144 and 156. An outlet passage 166 of the trim valve 78 selectively communicates pressurized fluid to the logic valve 144. Additionally, the trim valve 78 selectively communicates pressurized fluid to the boost valve 142 through an outlet passage 168. The logic valves 144 and 156 are in selective fluid communication with one another through passages 170, 172, and 174.

A backfill passage 176 is in fluid communication with the actuator feed regulator valve 70, the damper lock-out clutch trim valve 72, the trim valve 74, the trim valve 76, the trim valve 78, the logic valve 144, and the logic valve 156. The passage 112 communicates pressurized fluid to the backfill passage 176 through a series of flow restricting orifices 178. The fluid pressure within the backfill passage 176 is maintained at a value of approximately two pounds per square inch (psi) by a back fill regulator valve 180 to prevent air from entering the electro-hydraulic control system 28.

An exhaust passage 181 is in communication with the damper lock-out clutch trim valve 72, the trim valves 74, 76, and 78, and the boost valve 142. Pressurized fluid within feedback passage 182 is operable to provide a force balance when the damper lock-out clutch trim valve 72 is in the pressure regulation or trim position. The feedback passage 182 also communicates pressurized fluid to the auxiliary pump regulator valve 86 to modulate the pressure within the main passage 54 when the electrically controlled hydraulic pump 56 is operating. Likewise, pressurized fluid within a feedback passage 184 is operable to provide a force balance when the trim valve 74 is in the trim position. Pressurized fluid within a feedback passage 186 is operable to provide a force balance when the trim valve 76 is in the trim position. Additionally, pressurized fluid within a feedback passage 188 is operable to provide a force balance when the trim valve 78 is in the trim position and the boost valve 142 is in the spring set position. Alternately, when the boost valve 142 is in the pressure set position, the feedback passage 188 is exhausted.

The main passage 54 communicates pressurized fluid to a passage 190 though a series of flow restricting orifices 192. By providing fluid flow to the passage 190, the motor/generator 30 is provided with a measured amount of fluid flow to effect the cooling of the motor/generator 30. When additional fluid is required to cool the motor/generator 30, a passage 194 is selectively pressurized with fluid by the logic valve 156. Similarly, the main passage 54 communicates pressurized fluid to a passage 196 though a series of flow restricting orifices 198. By providing fluid flow to the passage 196, the motor/generator 32 is provided with a measured amount of fluid flow to effect the cooling of the motor/generator 32. When additional fluid is required to cool the motor/generator 32, a passage 200 is selectively pressurized with fluid by the logic valve 156.

Four pressure sensitive switches or pressure switches PS1, PS2, PS3, and PS4 are provided for position detection of the trim valves 74, 76, and 78 and the logic valves 144 and 156. The ability to monitor the above mentioned valves and detect any change, or lack of change, in valve state is of importance in order to provide continuous and reliable operation of the electrically variable hybrid transmission 14.

The electro-hydraulic control system 28 is capable of detecting state changes of the trim valves 74, 76, and 78 and the logic valves 144 and 156 by multiplexing the four pressure switches PS1, PS2, PS3, and PS4. The pressure switches PS1, PS2, PS3, and PS4 are disposed in selective fluid communication with the logic valve 144 and the trim valves 76, 78, and 74, respectively. Additionally, the pressure switches PS2 and PS4 communicate with the logic valve 156 through the trim valves 74 an 76. Traditionally, five pressure switches, one switch for each valve, would have been used to determine valve state changes.

Detection of a state change, or failure to change, of the logic valve 144 is accomplished through stand-alone detection using the pressure switch PS1. With the logic valve 144 in the spring set position, the pressure switch PS1 will exhaust. When the logic valve 144 moves to the pressure set position, a land 202 will block the pressure switch PS1 from exhausting. The passage 112 will communicate pressurized fluid to the pressure switch PS3 through orifices 204. Detection of a state change, or failure to change, of the trim valve 78 is accomplished through stand-alone detection using the pressure switch PS3. With the trim valve 78 in the spring set position, the passage 112 will communicate pressurized fluid to the pressure switch PS1. When the trim valve 78 moves to the pressure set position, a land 205 will block the passage 112 thereby allowing the pressure switch PS3 to exhaust to the backfill passage 176.

Detection of a state change or failure to change, of the logic valve 156 and the trim valves 76 and 74 is achieved by multiplexing the pressure switches PS2 and PS4. To achieve this, passage 206 is disposed in fluid communication with the trim valves 74 and 76 and the logic valve 156. Additionally, the passage 154 is disposed in fluid communication with the trim valves 74 and 76 and the logic valve 156. The passages 206 and 154 are selectively pressurized based on the position of the logic valve 156. When the logic valve 156 is in the spring set position, the passage 206 is pressurized with fluid from passage 112 through orifices 208 since the fluid cannot exhaust through the backfill passage 176 due to the position of logic valve 156. Alternately, when the logic valve 156 is in the pressure set position, the pressurized fluid within passage 206 will exhaust via the backfill passage 176. When the solenoid valve 126 is energized, the logic valve 156 moves to a pressure set position and the passage 154 will pressurize. Alternately, when the solenoid valve 126 is de-energized, the logic valve 156 will move to the spring set position and the passage 154 will exhaust.

This multiplexed system provides a reversal in states of pressurization between the passage 206 and 154. For example, if the logic valve 156 is in the pressure set position, the passage 154 will be pressurized and the passage 206 will exhaust. Alternately, if the logic valve 156 is in the spring set position, the passage 206 will be pressurized and the passage 154 will exhaust. This event will be indicated through a change in pressure state of both of the pressure switches PS2 and PS4 irrespective of the position of their respective trim valves 76 and 74. Changes in state of one of the trim valves 74 and 76 will result in only a single change in pressure switch state.

Park/Neutral Mode of Operation

When a park/neutral condition, as shown in FIGS. 2a and 2b, is requested the solenoid valve 130 will pressurize the passage 147, thereby pressurizing a spring pocket 210 of the ETRS valve 68. The pressurized fluid within the spring pocket 210 will de-latch the ETRS valve 68 placing it in a spring set position, as shown in FIG. 2a. With the ETRS valve 68 in the spring set position, the flow of pressurized fluid within the main passage 54 to passage 100 is blocked by the land 110. The passage 100 will exhaust allowing the spring 102 to bias the piston 104 of the servo 98. With the servo 98 in the spring biased position, the park pawl mechanism 106 is engaged by the link 108.

When disengagement of the park pawl mechanism 106 is desired, the fluid pressure within the passage 147 and the spring pocket 210 is exhausted. The ETRS valve 68 may be placed in the pressure set position in one of two ways. The trim valve 74 may selectively bias the ETRS valve 68 into a pressure set position by pressurizing the passage 160 via passage 158. The trim valve 74 must be in the trim or pressure set position to control the ETRS valve 68. Additionally, the solenoid valve 124 may selectively pressurize the passage 148 causing fluid pressure to act on the differential area 149 formed on the land 150. Once pressure within passage 160 and/or passage 148 is of a large enough magnitude to overcome the spring bias of the ETRS valve 68, the ETRS valve 68 will move to a pressure set position. The ETRS valve 68 will remain latched in the pressure set position by the pressurized fluid within the main passage 54 acting upon the land 110, until de-latched by increasing the pressure within the spring pocket 210 via the passage 147. With the ETRS valve 68 in the pressure set position, the pressurized fluid within the main passage 54 will pressurize the passage 100, thereby biasing the piston 104 of the servo 98 against the force of the spring 102. With the servo 98 in the pressure set position, the park pawl mechanism 106 will disengage.

FIGS. 2a and 2b collectively represent the electro-hydraulic control system 28 in an electrical power ON park/neutral mode of operation. In this mode, the park pawl mechanism 106 is engaged. For all other modes of operation, the park pawl mechanism 106 is disengaged. The logic valves 144 and 156 are in a spring set position. The torque transmitting mechanisms C1, C2, C3 and C4 will exhaust to the backfill passage 176. Pressurized fluid within the passage 206 communicates with the trim valve 74 to direct the pressure switch PS4 to report a high pressure state for diagnostic purposes. Similarly, pressurized fluid within the passage 112 communicates with the trim valve 78 to direct the pressure switch PS3 to report a high pressure state for diagnostic purposes, while the pressure switches PS1 and PS2 will report a low pressure state for diagnostic purposes.

Additionally, the trim valves 72, 74, 76, and 78 remain in the spring set position for this mode of operation. The motor/generator 30 and motor/generator 32 will receive pressurized fluid from the main passage 54 for cooling purposes.

Engine Off Electric Mode of Operation

When operating in an engine OFF electric mode of operation, the internal combustion engine 12, shown in FIG. 1, is shut off and the hybrid vehicle will rely solely on the electrical storage device 44 to power the motor/generators 30 and 32 to effect movement of the vehicle. As a result, the hydraulic pump 50 will no longer provide pressurized fluid to the main passage 54. Instead, the electrically controlled hydraulic pump 56 will provide fluid pressure to bias the check valve 58 and pressurize the main passage 54. The damper lock-out clutch trim valve 72 will bias to the pressure set position allowing pressurized fluid within the main passage 54 to effect engagement of the damper lock-out clutch 134. The damper lock-out clutch 134 is operable to prevent the torsional resonance associated with starting and stopping the engine 12 from being transmitted though the powertrain 10.

Additionally, the pressurized fluid within the outlet passage 66 is communicated to the auxiliary pump regulator valve 86 placing it in a regulating position. The auxiliary pump regulator valve 86 will provide excess fluid flow to the lubrication system 96.

In the electric low speed mode of operation, the logic valves 144 and 156 remain in the spring set position. The trim valve 78 is pressure set by energizing the solenoid valve 122. The trim valves 74 and 76 are placed in the trim position by energizing the solenoid valves 118 and 120, respectively. With the above stated valve configuration, the torque transmitting mechanisms C2, C3, and C4 will exhaust, while the torque transmitting mechanism C1 will engage. To effect engagement of the torque transmitting mechanism C1, pressurized fluid from the main passage 54 is communicated to the outlet passage 166 of the trim valve 78. The logic valve 144 will communicate the fluid within the outlet passage 166 to the torque transmitting mechanism C1. The trim valve 74 communicates pressurized fluid from the main passage 54 to the outlet passage 158. The logic valve 156 communicates pressurized fluid from the outlet passage 158 to the passage 194, thereby providing additional fluid flow to cool the motor/generator 30. The trim valve 76 communicates pressurized fluid from the main passage 54 to the outlet passage 164. The logic valve 156 communicates pressurized fluid from the outlet passage 164 to the passage 170. The logic valve 144 communicates pressurized fluid from the passage 170 to the passage 172. Subsequently, the logic valve 156 communicates pressurized fluid from the passage 172 to the passage 200, thereby providing additional fluid flow to cool the motor/generator 32.

The pressurized fluid within the passage 206 communicates with the trim valve 74 to direct the pressure switch PS4 to report a high pressure state for diagnostic purposes. The pressure switches PS1, PS2, and PS3 report a low pressure state for diagnostic purposes.

Electrically Variable Low Speed Mode of Operation

When operating in the electrically variable low speed mode of operation, the internal combustion engine 12 and the motor/generators 30 and 32 work in concert to effect movement of the vehicle. This continuously variable mode of operation employs the torque transmitting mechanism C1 in conjunction with the motor/generators 30 and 32. All garage shifts, i.e. neutral to reverse, reverse to neutral, neutral to drive, and drive to neutral, are performed while in the electrically variable, low speed mode of operation.

In this mode, the trim valve 78 is pressure set by energizing the solenoid valve 122. The trim valves 74 and 76 are placed in the trim position by energizing the solenoid valves 118 and 120, respectively. With the above stated valve configuration, the torque transmitting mechanisms C2, C3, and C4 will exhaust, while the torque transmitting mechanism C1 will engage. To effect engagement of the torque transmitting mechanism C1, pressurized fluid from the main passage 54 is communicated to the outlet passage 166 of the trim valve 78. The logic valve 144 communicates the fluid within the outlet passage 166 to the torque transmitting mechanism C1. The trim valve 74 communicates pressurized fluid from the main passage 54 to the outlet passage 158. The logic valve 156 communicates pressurized fluid from the outlet passage 158 to the passage 194, thereby providing additional fluid flow to cool the motor/generator 30. The trim valve 76 communicates pressurized fluid from the main passage 54 to the outlet passage 164. The logic valve 156 communicates pressurized fluid from the outlet passage 164 to the passage 170. The logic valve 144 communicates pressurized fluid from the passage 170 to the passage 172. Subsequently, the logic valve 156 communicates pressurized fluid from the passage 172 to the passage 200, thereby providing additional fluid flow to cool the motor/generator 32.

The pressurized fluid within the passage 206 communicates with the trim valve 74 to direct the pressure switch PS4 to report a high pressure state for diagnostic purposes. The pressure switches PS1, PS2, and PS3 report a low pressure state for diagnostic purposes.

Electrically Variable High Speed Mode of Operation

When operating in the electrically variable high speed mode of operation, the internal combustion engine 12 and the motor/generators 30 and 32 work in concert to effect movement of the vehicle. This continuously variable mode of operation employs the torque transmitting mechanism C2 in conjunction with the motor/generators 30 and 32. The logic valve 144 is pressure set by energizing the solenoid valve 124, while the logic valve 156 remains in the spring set position.

The trim valve 76 is pressure set by energizing the solenoid valve 120. The trim valves 74 and 78 are placed in the trim position by energizing the solenoid valves 118 and 122, respectively. With the above stated valve configuration, the torque transmitting mechanisms C1, C3, and C4 will exhaust, while the torque transmitting mechanism C2 will engage. To effect engagement of the torque transmitting mechanism C2, the trim valve 76 communicates pressurized fluid within the main passage 54 to the outlet passage 164, which is in fluid communication with the logic valve 144. The logic valve 144 communicates the pressurized fluid within the outlet passage 164 to the torque transmitting mechanism C2. The trim valve 74 communicates pressurized fluid from the main passage 54 to the outlet passage 158. The logic valve 156 communicates pressurized fluid from the outlet passage 158 to the passage 194, thereby providing additional fluid flow to cool the motor/generator 30. The trim valve 78 communicates pressurized fluid from the main passage 54 to the outlet passage 166. The logic valve 144 communicates pressurized fluid from the outlet passage 166 to the passage 172. The logic valve 156 communicates pressurized fluid from the passage 172 to the passage 200, thereby providing additional fluid flow to cool the motor/generator 32.

Pressurized fluid within the passage 206 communicates with the trim valves 74 and 76 to direct the pressure switches PS4 and PS2, respectively, to report a high pressure state for diagnostic purposes. Pressurized fluid within the passage 112 communicates with the trim valve 78 to direct the pressure switch PS3 to report a high pressure state for diagnostic purposes. Additionally, pressurized fluid within the passage 112 communicates with the pressure switch PS1 through the orifices 204 to direct the pressure switch PS1 to report a high pressure state for diagnostic purposes.

First Forward Range Mode of Operation

When operating in the first forward range mode of operation, the logic valve 156 is pressure set by energizing the solenoid valve 126 and the logic valve 144 is in the spring set position.

The trim valves 74 and 78 are pressure set by energizing the solenoid valves 116 and 122, respectively. The trim valve 76 is in the spring set position. With the above stated valve configuration, the torque transmitting mechanisms C2 and C3 will exhaust, while the torque transmitting mechanisms C1 and C4 will engage. To effect engagement of the torque transmitting mechanism C1, the trim valve 78 communicates pressurized fluid within the main passage 54 to the outlet passage 166. The logic valve 144 communicates the fluid within the outlet passage 166 to the torque transmitting mechanism C1. Additionally, to effect engagement of the torque transmitting mechanism C4, the trim valve 74 communicates pressurized fluid within the main passage 54 to the outlet passage 158, which is in fluid communication with the logic valve 156. The logic valve 156 communicates the pressurized fluid within the outlet passage 158 to the torque transmitting mechanism C4.

Pressurized fluid within the passage 154 communicates with the trim valves 74 and 76 to direct the pressure switches PS4 and PS2, respectively, to report a high pressure state for diagnostic purposes. The pressure switches PS1 and PS3 report a low pressure state for diagnostic purposes. The motor/generator 30 and motor/generator 32 receive pressurized fluid from the main passage 54 for cooling purposes.

Second Forward Range Mode of Operation

When operating in the second forward range mode of operation, the logic valve 156 is pressure set by energizing the solenoid valve 126 and the logic valve 144 is in the spring set position.

The trim valves 76 and 78 are pressure set by energizing the solenoid valves 120 and 122, respectively. The trim valve 74 is in the spring set position. With the above stated valve configuration, the torque transmitting mechanisms C3 and C4 will exhaust, while the torque transmitting mechanisms C1 and C2 will engage. To effect engagement of the torque transmitting mechanism C1, pressurized fluid from the main passage 54 is communicated to the outlet passage 166 of the trim valve 78. The logic valve 144 communicates the fluid within the outlet passage 166 to the torque transmitting mechanism C1. Additionally, to effect engagement of the torque transmitting mechanism C2, the trim valve 76 communicates pressurized fluid within the main passage 54 to the outlet passage 164, which is in fluid communication with the logic valve 156. The logic valve 156 communicates the pressurized fluid within the outlet passage 164 to the passage 174. The logic valve 144 communicates the fluid within passage 174 to the torque transmitting mechanism C2.

The pressure switches PS1, PS2, PS3, and PS4 report a low pressure state for diagnostic purposes. The motor/generator 30 and motor/generator 32 receive pressurized fluid from the main passage 54 for cooling purposes.

Third Forward Range Mode of Operation

When operating in the third forward range mode of operation, the logic valve 156 is pressure set by energizing the solenoid valve 126 and the logic valve 144 is in the spring set position.

The trim valves 74 and 76 are pressure set by energizing the solenoid valves 118 and 120, respectively. The trim valve 78 is in the spring set position. With the above stated valve configuration, the torque transmitting mechanisms C1 and C3 will exhaust, while the torque transmitting mechanisms C2 and C4 will engage. To effect engagement of the torque transmitting mechanism C2, the trim valve 76 communicates pressurized fluid within the main passage 54 is communicated to the outlet passage 164, which is in fluid communication with the logic valve 156. The logic valve 156 communicates the pressurized fluid within the outlet passage 164 to the passage 174. The logic valve 144 communicates the fluid within passage 174 to the torque transmitting mechanism C2. Additionally, to effect engagement of the torque transmitting mechanism C4, the trim valve 74 communicates pressurized fluid within the main passage 54 to the outlet passage 158, which is in fluid communication with the logic valve 156. The logic valve 156 communicates the pressurized fluid within the outlet passage 158 to the torque transmitting mechanism C4

Pressurized fluid within the passage 154 communicates with the trim valve 74 to direct the pressure switch PS4 to report a high pressure state for diagnostic purposes. Additionally, pressurized fluid within the passage 112 communicates with the trim valve 78 to direct the pressure switch PS3 to report a high pressure state for diagnostic purposes. The pressure switches PS1 and PS2 report a low pressure state for diagnostic purposes. The motor/generator 30 and motor/generator 32 receive pressurized fluid from the main passage 54 for cooling purposes.

An additional third forward range mode of operation is provided. When operating in this mode of operation, the logic valve 156 is pressure set by energizing the solenoid valve 126 and the logic valve 144 is pressure set by energizing the solenoid valve 124.

The trim valves 74 and 76 are pressure set by energizing the solenoid valves 118 and 120, respectively. The trim valve 78 is in the spring set position. With the above stated valve configuration, the torque transmitting mechanisms C1 and C3 will exhaust, while the torque transmitting mechanisms C2 and C4 will engage. To effect engagement of the torque transmitting mechanism C2, pressurized fluid from the main passage 54 is communicated to the outlet passage 164 of the trim valve 76, which is in fluid communication with the logic valve 144. The logic valve 144 communicates the fluid within the outlet passage 164 to the torque transmitting mechanism C2. Additionally, to effect engagement of the torque transmitting mechanism C4, the trim valve 74 communicates pressurized fluid within the main passage 54 to the outlet passage 158, which is in fluid communication with the logic valve 156. The logic valve 156 communicates the pressurized fluid within the outlet passage 158 to the torque transmitting mechanism C4

Pressurized fluid within the passage 154 communicates with the trim valve 74 to direct the pressure switch PS4 to report a high pressure state for diagnostic purposes. The pressurized fluid within the passage 112 communicates with the trim valve 78 to direct the pressure switch PS3 to report a high pressure state for diagnostic purposes. Additionally, pressurized fluid within the passage 112 communicates with the pressure switch PS1 through the orifices 204 to direct the pressure switch PS1 to report a high pressure state for diagnostic purposes. The pressure switch PS2 reports a low pressure state for diagnostic purposes. The motor/generator 30 and motor/generator 32 receive pressurized fluid from the main passage 54 for cooling purposes.

Fourth Forward Range Mode of Operation

When operating in the fourth forward range mode of operation, the logic valve 156 is pressure set by energizing the solenoid valve 126 and the logic valve 144 is pressure set by energizing the solenoid valve 124.

The trim valves 76 and 78 are pressure set by energizing the solenoid valves 120 and 122, respectively. The trim valve 74 is in the spring set position. With the above stated valve configuration, the torque transmitting mechanisms C1 and C4 will exhaust, while the torque transmitting mechanisms C2 and C3 will engage. To effect engagement of the torque transmitting mechanism C2, the trim valve 76 communicates pressurized fluid within the main passage 54 to the outlet passage 164, which is in fluid communication with the logic valve 144. The logic valve 144 communicates the fluid within the outlet passage 164 to the torque transmitting mechanism C2. Additionally, to effect engagement of the torque transmitting mechanism C3, the trim valve 78 communicates pressurized fluid within the main passage 54 to the outlet passage 166, which is in fluid communication with the logic valve 144. The logic valve 144 communicates the pressurized fluid within the outlet passage 166 to the passage 172. The logic valve 156 communicates the fluid within the passage 172 to the torque transmitting mechanism C3

Pressurized fluid within the passage 112 communicates with the pressure switch PS1 through the orifices 204 to direct the pressure switch PS1 to report a high pressure state for diagnostic purposes. The pressure switches PS2, PS3, and PS4 report a low pressure state for diagnostic purposes. The motor/generator 30 and motor/generator 32 will receive pressurized fluid from the main passage 54 for cooling purposes.

The electro-hydraulic control system 28 provides for controlled single step ratio interchanges in both an upshifting direction and a downshifting direction through engagement and disengagement of respective torque transmitting mechanisms when electrical power is available. Those skilled in the art will also recognize that the electro-hydraulic control system 28 will permit skip shifting or double ratio interchanges in the forward direction. A first forward range to third forward range interchange is available by operating the trim valves 76 and 78 to disengage the torque transmitting mechanism C1 while engaging the torque transmitting mechanism C2. Alternately, a third forward range to first forward range interchange is available by operating the trim valves 76 and 78 to engage the torque transmitting mechanism C1 while disengaging the torque transmitting mechanism C2.

Electrical Power Off Low Speed Drive Home Mode of Operation

If there is an interruption of electrical power to the electro-hydraulic control system 28 and the transmission is operating with the torque transmitting mechanism C1 engaged, the electro-hydraulic control system 28 will default to an electrical power OFF, electrically variable low speed mode of operation. In this mode, both logic valves 144 and 156 are in the spring set position since the solenoid valves 124 and 126 are normally closed type valves.

The trim valves 76 and 78 will move to the pressure set position since their respective solenoid valves 120 and 122 are normally open type valves. The trim valve 74 will move to the spring set position since the solenoid valve 118 is a normally closed type valve. With the above stated valve configuration, the torque transmitting mechanisms C2, C3, and C4 will exhaust, while the torque transmitting mechanism C1 will engage. To effect engagement of the torque transmitting mechanism C1, pressurized fluid from the main passage 54 is communicated to the outlet passage 166 of the trim valve 78. The logic valve 144 will communicate the fluid within the outlet passage 166 to the torque transmitting mechanism C1.

The motor/generator 30 receives pressurized fluid from the main passage 4 for cooling purposes. The trim valve 76 communicates pressurized fluid from within the main passage 54 to the outlet passage 164. The logic valve 156 communicates the fluid within the outlet passage 164 to the passage 170. The logic valve 144 communicates the fluid within the passage 170 to the passage 172. The logic valve 156 communicates the fluid within the passage 172 to the passage 200, thereby increasing the flow of fluid operable to cool the motor/generator 32.

Electrical Power Off High Speed Drive Home Mode of Operation

If the electrical power to the electro-hydraulic control system 28 is interrupted and the transmission is operating with the torque transmitting mechanism C2 engaged, the electro-hydraulic control system 28 will default to an electrical power OFF, high speed mode of operation. In this mode, the logic valve 156 is in a spring set position since the solenoid valve 126 is a normally closed type valve. The fluid pressure within the passage 140, from the normally open solenoid valve 122, acting upon the differential area 152 will latch the logic valve 144 in the pressure set position. This latched condition will occur when the logic valve 144 is in the pressure set position, i.e. the torque transmitting mechanism C2 is engaged, and electrical power is interrupted to the solenoid valve 124.

The trim valves 76 and 78 will move to the pressure set position since their respective solenoid valves 120 and 122 are normally open type valves. The trim valve 74 will move to the spring set position since the solenoid valve 118 is normally closed. With the above stated valve configuration, the torque transmitting mechanisms C1, C3, and C4 will exhaust, while the torque transmitting mechanism C2 will engage. To effect engagement of the torque transmitting mechanism C2, the trim valve 76 communicates pressurized fluid within the main passage 54 to the outlet passage 164, which is in fluid communication with the logic valve 144. The logic valve 144 communicates the fluid within the outlet passage 164 to the torque transmitting mechanism C2.

The motor/generator 30 receives pressurized fluid from the passage 54 for cooling purposes. The trim valve 78 communicates pressurized fluid from within the main passage 54 to the outlet passage 166. The logic valve 144 communicates the fluid within the outlet passage 166 to the passage 172. The logic valve 156 communicates the fluid within the passage 172 to the passage 200, thereby increasing the flow of fluid operable to cool the motor/generator 32.

While the best modes for carrying out the invention have been described in detail, those familiar with the art to which this invention relates will recognize various alternative designs and embodiments for practicing the invention within the scope of the appended claims.

The invention claimed is:

1. A pressure switch diagnostic system for an electrically variable hybrid transmission comprising:
   a plurality of trim valves each having a first and a second position;

a plurality of pressure sensitive switches, having a high and a low pressure state, each in selective fluid communication with one of said plurality of trim valves;

wherein each of said plurality of pressure sensitive switches are operable to detect a change from said first to said second position or a change from said second to said first position of its respective one of said plurality of trim valves and accordingly each of said plurality of pressure switches will report one of said high or said low pressure state; and at least one logic valve in selective fluid communication with at least one of said plurality of pressure sensitive switches such that said at least one of said plurality of pressure sensitive switches are operative to detect position changes in said at least one logic valve without requiring an additional pressure sensitive switch to detect a change in position of said at least one logic valve.

2. The pressure switch diagnostic system for an electrically variable hybrid transmission of claim 1, wherein a first of said at least one logic valve has a first position and a second position and is disposed in selective fluid communication with a first and a second of said plurality of trim valves respectively having a first and second of said plurality of pressure sensitive switches in selective fluid communication therewith, said first and said second of said plurality of pressure sensitive switches being operable to detect a change in position of said first of said at least one logic valve when said first of said at least one logic valve moves from said first to said second position or from said second to said first position irrespective of the position of said first and second of said plurality of trim valves.

3. The pressure switch diagnostic system for an electrically variable hybrid transmission of claim 1, wherein a second of said at least one logic valve, having a first position and a second position, is disposed in selective fluid communication with a third of said plurality of pressure sensitive switches disposed in selective fluid communication therewith, said third of said plurality of pressure sensitive switches being operable to detect a change in position of said second of said at least one logic valve from said first position to said second position or said second position to said first position.

4. The pressure switch diagnostic system for an electrically variable hybrid transmission of claim 1, wherein said plurality of trim valves are solenoid operated pressure regulator valves.

5. The pressure switch diagnostic system for an electrically variable hybrid transmission of claim 1, wherein said at least one logic valve is a multiplex valve.

6. The pressure switch diagnostic system for an electrically variable hybrid transmission of claim 1, wherein said plurality of trim valves and said at least one logic valve are selectively controlled by an electronic control unit.

7. The pressure switch diagnostic system for an electrically variable hybrid transmission of claim 1, wherein said plurality of pressure sensitive switches selectively report said high and said low pressure state to an electronic control unit.

8. A pressure switch diagnostic system for an electrically variable hybrid transmission comprising:

a first trim valve, having a first position and a second position, in selective fluid communication with a first pressure sensitive switch, wherein said first pressure sensitive switch is operable to detect and report a change from said first to said second position or said second to said first position of said first trim valve;

a second trim valve, having a first position and a second position, in selective fluid communication with a second pressure sensitive switch, wherein said second pressure sensitive switch is operable to detect and report a change from said first to said second position or said second to said first position of said second trim valve;

a first logic valve, having a first position and a second position, disposed in selective fluid communication with each of said first trim valve and said second trim valve; and wherein said first and second trim valves and said first and second, pressure sensitive switches and said first logic valve are connected in a multiplexed arrangement such that there are fewer of said pressure sensitive switches than the sum of said trim valves and said logic valve.

9. The pressure switch diagnostic system for an electrically variable hybrid transmission of claim 8, wherein said first pressure sensitive switch and said second pressure sensitive switch are operable to detect a change from said first to said second position or said second to said first position of said first logic valve irrespective of the position of said first trim valve and said second trim valve.

10. The pressure switch diagnostic system for an electrically variable hybrid transmission of claim 8, further comprising:

a third trim valve, having a first position and a second position, in selective fluid communication with a third pressure sensitive switch, wherein said third pressure sensitive switch is operable to detect and report a change from said first to said second position or said second to said first position of said third trim valve.

11. The pressure switch diagnostic system for an electrically variable hybrid transmission of claim 8, further comprising:

a second logic valve, having a first position and a second position, disposed in selective fluid communication with a fourth pressure sensitive switch, wherein said fourth pressure sensitive switch is operable to detect and report a change from said first to said second position or said second to said first position of said second logic valve.

12. The pressure switch diagnostic system for an electrically variable hybrid transmission of claim 10, wherein said first, second, and third trim valves are solenoid operated pressure regulator valves.

13. The pressure switch diagnostic system for an electrically variable hybrid transmission of claim 11, wherein said first and second logic valve are multiplex valves.

14. A pressure switch diagnostic system for an electrically variable hybrid transmission comprising:

a first trim valve, having a first position and a second position, in selective fluid communication with a first pressure sensitive switch, wherein said first pressure sensitive switch is operable to detect and report a change from said first to said second position or said second to said first position of said first trim valve;

a second trim valve, having a first position and a second position, in selective fluid communication with a second pressure sensitive switch, wherein said second pressure sensitive switch is operable to detect and report a change from said first to said second position or said second to said first position of said second trim valve;

a third trim valve, having a first position and a second position, in selective fluid communication with a third pressure sensitive switch, wherein said third pressure sensitive switch is operable to detect and report a change from said first to said second position or said second to said first position of said third trim valve;

a first logic valve, having a first position and a second position, disposed in selective fluid communication with each of said first trim valve and said second trim valve;

a second logic valve, having a first position and a second position, disposed in selective fluid communication with a fourth pressure sensitive switch, wherein said fourth pressure sensitive switch is operable to detect and report a change from said first to said second position or said second to said first position of said second logic valve; and wherein said first pressure sensitive switch and said second pressure sensitive switch are operable to detect a change from said first to said second position or said second to said first position of said first logic valve irrespective of the position of said first trim valve and said second trim valve.

15. The pressure switch diagnostic system for an electrically variable hybrid transmission of claim 14, wherein said first, second, and third trim valves are solenoid operated pressure regulator valves.

16. The pressure switch diagnostic system for an electrically variable hybrid transmission of claim 14, wherein said first and second logic valve are multiplex valves.

17. The pressure switch diagnostic system for an electrically variable hybrid transmission of claim 14, wherein said first, second, and third trim valves and said first and second logic valve are selectively controlled by an electronic control unit.

* * * * *